United States Patent
Takemura et al.

(10) Patent No.: US 7,043,353 B2
(45) Date of Patent: May 9, 2006

(54) KNOCK DETERMINING APPARATUS AND METHOD FOR INTERNAL COMBUSTION ENGINE

(75) Inventors: Yuichi Takemura, Anjo (JP); Satoshi Masuda, Kariya (JP); Masaomi Inoue, Kariya (JP); Kenji Kasashima, Aichi-ken (JP); Rihito Kaneko, Aichi-ken (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/106,581

(22) Filed: Apr. 15, 2005

(65) Prior Publication Data

US 2005/0234633 A1    Oct. 20, 2005

(30) Foreign Application Priority Data

Apr. 16, 2004   (JP) ............................. 2004-121865

(51) Int. Cl.
   *G01L 23/22*   (2006.01)
(52) U.S. Cl. ..................................... 701/111
(58) Field of Classification Search ............... 701/111, 701/102, 115; 73/35.02, 35.04, 35.08; 123/406.38, 123/406.39
   See application file for complete search history.

(56) References Cited

U.S. PATENT DOCUMENTS 4,334,422 A    6/1982   Kawai et al.
5,188,080 A *  2/1993   Sakakibara et al. ..... 123/406.38
6,311,672 B1  11/2001   Morishita et al.

FOREIGN PATENT DOCUMENTS

JP        6-60621        12/1985
JP        3-121269 A  *  5/1991

OTHER PUBLICATIONS

Guillaume Brecq et al., "A New Indicator For Knock Detection in Gas SI Engines," International Journal of Thermal Sciences 42 (2003) pp. 523-532.
European Search Report dated Oct. 19, 2005.

* cited by examiner

*Primary Examiner*—Hieu T. Vo
(74) *Attorney, Agent, or Firm*—Kenyon & Kenyon LLP

(57) ABSTRACT

A plurality of variables representing the characteristics of a knock is obtained from an output signal of a sensor. The variables include a peak value of the knock frequency component in the output signal of the sensor and a waveform correlation coefficient representing the correlation between the waveform of the output signal and an ideal knock waveform, which is the waveform specific to a knock. The peak value and the waveform correlation coefficient are normalized, and a detection distribution is created using the obtained normalized data values. A correlation coefficient for knock determination representing the correlation between the detection distribution and an ideal knock distribution is calculated. The correlation coefficient for knock determination is compared with a predetermined knock determination threshold value, and the knock determination threshold value is corrected in accordance with the comparison result. As a result, the accuracy and the reliability of knock determination are improved.

11 Claims, 6 Drawing Sheets

Waveform Correlation Coefficient c [θ] before Peak

Waveform Correlation Coefficient c [θ] after Peak

KNOCK DETERMINING APPARATUS AND METHOD FOR INTERNAL COMBUSTION ENGINE

BACKGROUND OF THE INVENTION

The present invention relates to an apparatus and a method for determining occurrence of a knock in an internal combustion engine.

A knock determining apparatus of a typical internal combustion engine includes a knock sensor attached to the cylinder block of the internal combustion engine. The knock sensor detects vibration of the cylinder block caused by a knock. The determining apparatus extracts the knock frequency component from an output signal of the knock sensor by a bandpass filter and compares a peak value of the knock frequency component or an integral of the knock frequency component during a predetermined interval with a knock determination threshold value to perform knock determination.

A knock is prevented by retarding the ignition timing, but retarding the ignition timing deteriorates the engine output and the fuel economy. Therefore, it is required to advance the ignition timing within a range of knock noise tolerable to the human ear and improve the engine output and the fuel economy. Therefore, the knock determination threshold value needs to be adapted to a value that permits detecting only a knock exceeding the permissible level to the human ear.

From this aspect, Japanese Examined Patent Publication No. 6-60621 discloses an apparatus that corrects the knock determination threshold value such that the distribution of a value obtained by the logarithmic conversion of the peak value of an output signal of the knock sensor will have a predetermined profile.

However, in the distribution that only uses the peak value of the output signal of the knock sensor, when a mechanical or electrical noise overlaps the output signal of the knock sensor, the distribution profile is formed that is similar to the profile made when a knock occurs. This deteriorates the correction accuracy of the knock determination threshold value, thereby deteriorating the knock determination accuracy.

SUMMARY OF THE INVENTION

Accordingly, it is an objective of the present invention to provide a knock determining apparatus and method for an internal combustion engine that solves deterioration of the knock determination accuracy due to noise and improves the accuracy and the reliability of knock determination.

To achieve the above objective, a knock determining apparatus for an internal combustion engine provided by the present invention includes a sensor, a distribution determining section, and a knock state determining section. The sensor outputs a signal that has a waveform corresponding to the knock state of the internal combustion engine. The distribution determining section obtains variables representing the characteristics of a knock from an output signal of the sensor every time the engine is ignited. The distribution determining section obtains a distribution of the variables corresponding to a predetermined number of times of ignition. The knock state determining section determines the occurrence of a knock based on whether the profile of the distribution obtained by the distribution determining section has the characteristics that appear at the occurrence of a knock.

As described above, in the present invention, variables representing the characteristics of a knock are obtained from an output signal of the sensor, and a distribution of the variables corresponding to a predetermined number of times of ignition is obtained. Therefore, unlike the distribution of only the peak value of the sensor output as that created in the publication No. 6-60621, a distribution that distinguishes noise from a knock is created. Therefore, deterioration of knock determination accuracy due to noise is solved, thereby improving the accuracy and the reliability of knock determination.

The variables preferably include a peak value of the knock frequency component in the output signal of the sensor and a waveform correlation coefficient representing the correlation between the waveform of the output signal and an ideal knock waveform, which is the waveform specific to a knock. In this case, even if noise and a knock cannot be distinguished with only the peak value of the knock frequency component in the output signal of the sensor, the waveform correlation coefficient distinguishes noise from a knock with high accuracy.

The vibration of the cylinder block and the fluctuation of the combustion pressure vary by a relatively large amount in accordance with the operating condition of the internal combustion engine. Therefore, when creating the distribution directly from the output signal of the sensor, the distribution profile varies in accordance with the engine operating condition. Thus, when creating the distribution directly from the output signal of the sensor, the distribution needs to be created for each engine operating condition.

The data values of the variables corresponding to a predetermined number of times of ignition are preferably normalized (equated, made dimensionless) using the mean and the standard deviation of each variable and the distribution of the normalized data values of the variables is obtained. In this case, a universal distribution is created that has no differences due to the operating condition of the engine, and the distribution need not be created per each engine operating condition. This reduces the processing load of producing a distribution and prevents deterioration of the accuracy of the distribution due to changes of the engine operating condition.

To calculate the mean and the standard deviation exactly as the definitional equations, a memory that can store a lot of data values is necessary. Furthermore, the mean and the standard deviation are not updated until a predetermined amount of data values are stored. Therefore, the mean and the standard deviation may be approximately obtained by filtering the variables. In this case, since the memory capacity is saved, and the mean and the standard deviation are updated every time the variable is obtained, fast response is achieved.

When creating a distribution, all the regions in which the detection distribution possibly exists may be subdivided into smaller regions, and a counter may be provided in each region. However, in this case, the number of the counters becomes excessive and excessive amount of the memory is used.

Regions in which the characteristics of a knock become significant (hereinafter referred to as characteristic regions) are extracted from regions in which the distribution possibly exists, each characteristic region is provided with a counter, and the counter of the characteristic region to which the variables belong is incremented at every ignition to obtain the distribution. Thus, the counters of only the few characteristic regions in which the characteristics of a knock become significant are incremented. This considerably saves the amount of the memory used. Furthermore, since only the portions in which the characteristics of a knock become significant are selected and extracted, the accuracy and the reliability of knock determination are sufficiently secured.

Furthermore, the distribution of the variables corresponding to the predetermined number of times of ignition when a knock exceeding a permissible level is occurring is stored as an ideal knock distribution in a storage section. The correlation between the distribution obtained by the distribution determination section and the ideal knock distribution is obtained while the engine is running. It is determined that the knock level is greater (frequency of occurrence of knocks is higher) as the correlation is increased. In this case, the knock level is accurately determined.

When embodying the present invention, the knock level (frequency of occurrence of knocks) is determined based on the distribution obtained by the distribution determination section. The knock level is compared with a predetermined knock determination threshold value to determine the existence of a knock. The knock determination threshold value is corrected in accordance with the comparison result between the knock level and the knock determination threshold. In this case, even if a mechanical or electrical noise overlaps the output signal of the sensor, the knock determination threshold value is accurately corrected. This prevents decrease of the knock determination accuracy due to noise. Furthermore, the knock determination threshold value is automatically corrected in accordance with the production variation of the engine and changes of vibration level with time. Therefore, high precision knock determination is performed always using the appropriate knock determination threshold value. In addition, a design and development engineer need not to closely consider the influence of the production variation of the engine and deterioration with time when adapting the knock determination threshold value to the engine. This simplifies a process for adapting the knock determination threshold value to the engine.

As a sensor that outputs a signal having a waveform that corresponds to the knock state of the engine, a knock sensor, which detects the vibration of the cylinder block of the engine, a combustion pressure sensor, which detects the combustion pressure of the engine, or an ion current sensor, which detects the ion current in the combustion chamber of the engine, may be used. A knock occurs when an air-fuel mixture in a cylinder of the engine causes autoignition to be rapidly combusted without waiting for the flame propagation caused by the ignition of an ignition plug. The rapid combustion of the air-fuel mixture caused by autoignition vibrates combustion gas in the cylinder and fluctuates the combustion pressure and the ion generated during the combustion. Such vibration and fluctuation are transmitted to the cylinder block and generate a knocking sound (rattling sound) audible to the outside. Therefore, the vibration waveform specific to a knock is detected using any of the knock sensor, the combustion pressure sensor, and the ion current sensor.

The present invention also provides a knock determining method for an internal combustion engine. The method includes: outputting a signal that has a waveform corresponding to the knock state of the internal combustion engine from a sensor; obtaining variables representing the characteristics of a knock from an output signal of the sensor every time the engine is ignited; obtaining a distribution of the variables corresponding to a predetermined number of times of ignition; and determining the occurrence of a knock based on whether the profile of the obtained distribution has the characteristics that appear at the occurrence of a knock.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
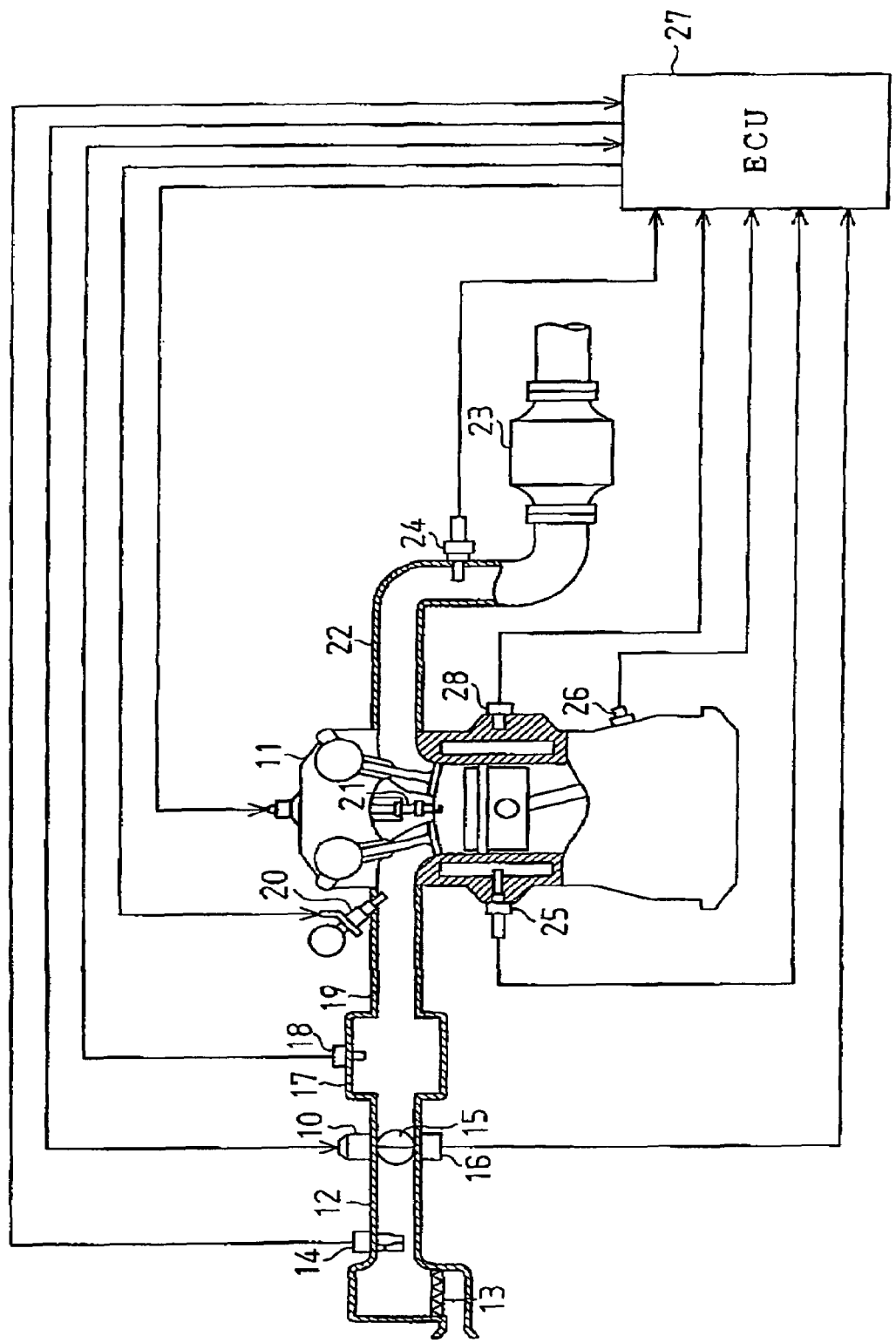
FIG. 1 is a schematic diagram of an entire engine control system according to one embodiment of the present invention.

One embodiment of the present invention will now be described with reference to the drawings. At first, the schematic configuration of an entire engine control system will be described with reference to FIG. 1. An internal combustion engine, which is an engine 11 in this embodiment, has an intake pipe 12. At the most upstream section of the intake pipe 12, an air cleaner 13 is provided. An air flow meter 14, which detects the intake air amount, is provided downstream of the air cleaner 13. A throttle valve 15, the opening degree of which is adjusted by a motor 10, and a throttle opening sensor 16, which detects the throttle opening degree, are located downstream of the air flow meter 14.

Furthermore, a surge tank 17, which is connected to the intake pipe 12, is located downstream of the throttle valve 15. An intake pipe pressure sensor 18, which detects the intake pipe pressure, is located in the surge tank 17. An intake manifold 19, which introduces air into cylinders of the engine 11, is connected to the surge tank 17. The intake manifold 19 extends from the surge tank 17 to intake ports of the cylinders while being branched. Fuel injection valves 20, which inject fuel, are attached to the intake manifold 19 to be located in the vicinity of the respective intake ports. Ignition plugs 21 each corresponding to one of the cylinders are attached to the cylinder head of the engine 11. Spark discharge of each ignition plug 21 ignites the air-fuel mixture in the corresponding cylinder.

On the other hand, a catalyst 23 such as a three-way catalyst that removes CO, HC, NOx, or the like from emission gas are provided in an exhaust pipe 22 of the engine 11, and an air-fuel ratio sensor 24, which detects the air-fuel ratio of emission gas, is located upstream of the catalyst 23. A coolant temperature sensor 25, which detects the coolant temperature, a knock sensor 28, which detects the knock vibration, and a crank angle sensor 26, which outputs a pulse signal every time a crankshaft of the engine 11 rotates by a predetermined crank angle, are attached to a cylinder block of the engine 11. Based on the output signal of the crank angle sensor 26, the crank angle and the engine speed are detected.

The output of the various types of sensors are supplied to an engine control unit (hereinafter, referred to as ECU) 27. The ECU 27 is mainly composed of a microcomputer and controls the fuel injection amount of the fuel injection valve 20 and the ignition timing of the ignition plug 21 by executing various types of engine control programs stored in an incorporated ROM (storing media).

Furthermore, the ECU 27 obtains two variables (a peak value and a waveform correlation coefficient) representing the characteristics of a knock from the output of the knock sensor 28 (hereinafter, simply referred to as the sensor output) at every ignition by executing routines for knock determination in FIGS. 2 to 5, which will be described later. The ECU 27 normalizes (equates, makes dimensionless) the data values of the two variables corresponding to a predetermined number of times of ignition and obtains the distribution of the normalized data values of the two variables. The ECU 27 calculates the correlation coefficient (degree of similarity) for knock determination representing the correlation (similarity) between the distribution and an ideal knock distribution as an index representing the knock level (frequency of occurrence of knocks). Based on the calculated correlation coefficient for knock determination, the ECU 27 corrects the knock determination threshold value used in knock determination made at every single combustion. The ECU 27 compares the product of the two variables (the peak value and the waveform correlation coefficient) with the knock determination threshold value at every single combustion and determines the presence or absence of a knock at every single combustion. The ECU 27 performs a knock control in which, the ECU 27 suppresses a knock by retarding the ignition timing when it is determined that a knock is present, and the ECU 27 advances the ignition timing when it is determined that a knock continues to be absent. Accordingly, the ECU 27 improves the engine output and the fuel consumption by advancing the ignition timing within a range of knock noise tolerable to the human ear.

Hereafter, the method of knock determination will be described.

(1) Variables Extracted from Sensor Output

Variables extracted from sensor output represent the characteristics of a knock. In this embodiment, the peak value of the knock frequency component in the sensor output and the waveform correlation coefficient representing the correlation between the waveform of the sensor output and the ideal knock waveform, which is the waveform specific to a knock, are used as the variables. The waveform correlation coefficient is computed in the following manner. At first, the knock waveform that shows the ideal profile during the period before and after the peak is set as the ideal knock waveform. If the increase rate of the sensor output waveform before the peak is steeper than that of the ideal knock waveform, the ideal knock waveform is simply added up to obtain the waveform area before the peak. On the other hand, if the increase rate of the sensor output waveform before the peak is gentler than that of the ideal knock waveform, the waveform area before the peak is obtained by adding a value obtained by correcting the ideal knock waveform to be decreased by a predetermined amount in accordance with the difference between the sensor output waveform and the ideal knock waveform.

The waveform area after the peak is obtained by adding a value obtained by correcting the ideal knock waveform to be decreased in accordance with the difference between the sensor output waveform after the peak and the ideal knock waveform. In this manner, after the computations of the waveform area before and after the peak are completed, the waveform area before the peak and the waveform area after the peak are summed to obtain the waveform area during a predetermined period from before the peak to after the peak. Then, the waveform area divided by the area of the ideal knock waveform is regarded as the waveform correlation coefficient.

(2) Normalization of Variables

While the engine is running, the data values of the peak value and the waveform correlation coefficient extracted from the sensor output, are stored in the memory of the ECU 27. Then, every time the data values corresponding to the predetermined number of times of ignition are stored, the mean and the standard deviation of each of the peak value and the waveform correlation coefficient are calculated. Using the mean and the standard deviation, the peak value and the waveform correlation coefficient are normalized (equated, made dimensionless) by the following equations.

Normalized peak value= (peak value−mean of peak value)/standard deviation of peak value Normalized waveform correlation coefficient=(waveform correlation coefficient−mean of waveform correlation coefficient)/standard deviation of waveform correlation coefficient According to this normalization, universal variables (the peak value and the waveform correlation coefficient) are obtained that have no differences due to the operating condition of the engine.

To calculate the mean and the standard deviation exactly as the definitional equations, a memory that can store a lot of data values is necessary. Therefore, in this embodiment, the mean and the standard deviation are approximately obtained by a filtering process (smoothing process). In this case, since the mean and the standard deviation are sequentially computed, a sequential normalization process can be performed using the approximately and sequentially computed mean and the standard deviation without storing a lot of data values in the memory.

(3) Create Detection Distribution

It is determined to which of the regions, which are divided in advance, the normalized data values (Sp, Sc) of each of the peak value Sp and the waveform correlation coefficient Sc correspond, and the counter of the appropriate region is incremented. This process is repeated by a number of times corresponding to a predetermined number of times of ignition to create the detection distribution.

At this time, all the regions in which the detection distribution possibly exists may be subdivided into smaller regions, and a counter may be provided in each region to create the detection distribution. However, in this case, the number of the counters becomes excessive and excessive amount of the memory of the ECU 27 is used.

Therefore, in this embodiment, a few regions in which the characteristics of a knock become significant (hereinafter, referred to as characteristic regions) are extracted from the regions in which the detection distribution possibly exists. Then, a counter is provided in each characteristic region. The distribution of the normalized data values (Sp, Sc) is obtained by incrementing, at each ignition, the counter in the characteristic region to which the normalized data values (Sp, Sc) of the peak value Sp and the waveform correlation coefficient Sc belong. Thus, the normalized data values (Sp, Sc) in only the few characteristic regions in which the characteristics of a knock become significant is counted. This considerably saves the amount of the memory used. Furthermore, since only the portions in which the characteristics of a knock become significant are selected and extracted, the accuracy and the reliability of knock determination are sufficiently secured.

(4) Correlation between Detection Distribution and Ideal Knock Distribution (Determination of Knock Level)

The correlation coefficient (degree of similarity) for knock determination that represents the correlation (similarity) between the detection distribution of the normalized data values (Sp, Sc) and the ideal knock distribution is computed. The correlation coefficient for knock determination serves as an index for determining whether the profile of the detection distribution has the characteristics that appear at the occurrence of a knock.

The ideal knock distribution is the distribution of the normalized data values (Sp, Sc) computed in advance using the above mentioned method when a knock exceeding a permissible level is occurring, and is stored in a nonvolatile memory (storage means or storage section) such as the ROM of the ECU 27. The correlation coefficient for knock determination is obtained by dividing the inner product of the pattern of the detection distribution and the pattern of the ideal knock distribution by the product of the norms. The division by the product of the norms causes the absolute value of the correlation coefficient for knock determination to constantly become less than or equal to one ($-1 \leq$ correlation coefficient for knock determination $\leq 1$), and as the correlation between the detection distribution and the ideal knock distribution is increased, the correlation coefficient for knock determination approaches a value close to one. Therefore, the correlation coefficient for knock determination serves as an index representing the knock level (frequency of occurrence of knocks), and as the correlation coefficient for knock determination approaches a value close to one, the knock level is determined to be great (frequency of occurrence of knocks is high).

(5) Correction of Knock Determination Threshold Value

The correlation coefficient for knock determination is compared with a predetermined knock determination threshold value. If the correlation coefficient for knock determination is greater than or equal to the knock determination threshold value, it is determined that a knock exceeding the permissible level is occurring. Thus, a knock determination threshold value used for knock determination at every single combustion is corrected to be decreased. Therefore, small knocks are detected.

Contrarily, if the correlation coefficient for knock determination is smaller than the knock determination threshold value, the knock level is determined to be below the permissible level. In this case, there is a possibility that the ignition timing is retarded more than necessary by the knock control, thereby decreasing the engine torque. Therefore, the knock determination threshold value is corrected to be increased to detect only greater knocks. When the correlation coefficient for knock determination is within a predetermined range corresponding to an appropriate knock state, the knock determination threshold value need not be corrected.

According to such a process, the knock determination threshold value is automatically corrected in accordance with the production variation of the engine and changes of the vibration level with time. Therefore, high precision knock determination is performed always using the appropriate knock determination threshold value. In addition, a design and development engineer need not to closely consider the influence of the production variation of the engine and deterioration with time when adapting the knock determination threshold value to the engine. This simplifies a process for adapting the knock determination threshold value to the engine.

The above mentioned correction of the knock determination threshold value is executed by the ECU 27 in accordance with the routines of FIGS. 2 to 5. The processes of each routine will now be described.

[Knock Determination Threshold Value Correction Routine]

Figure 2:
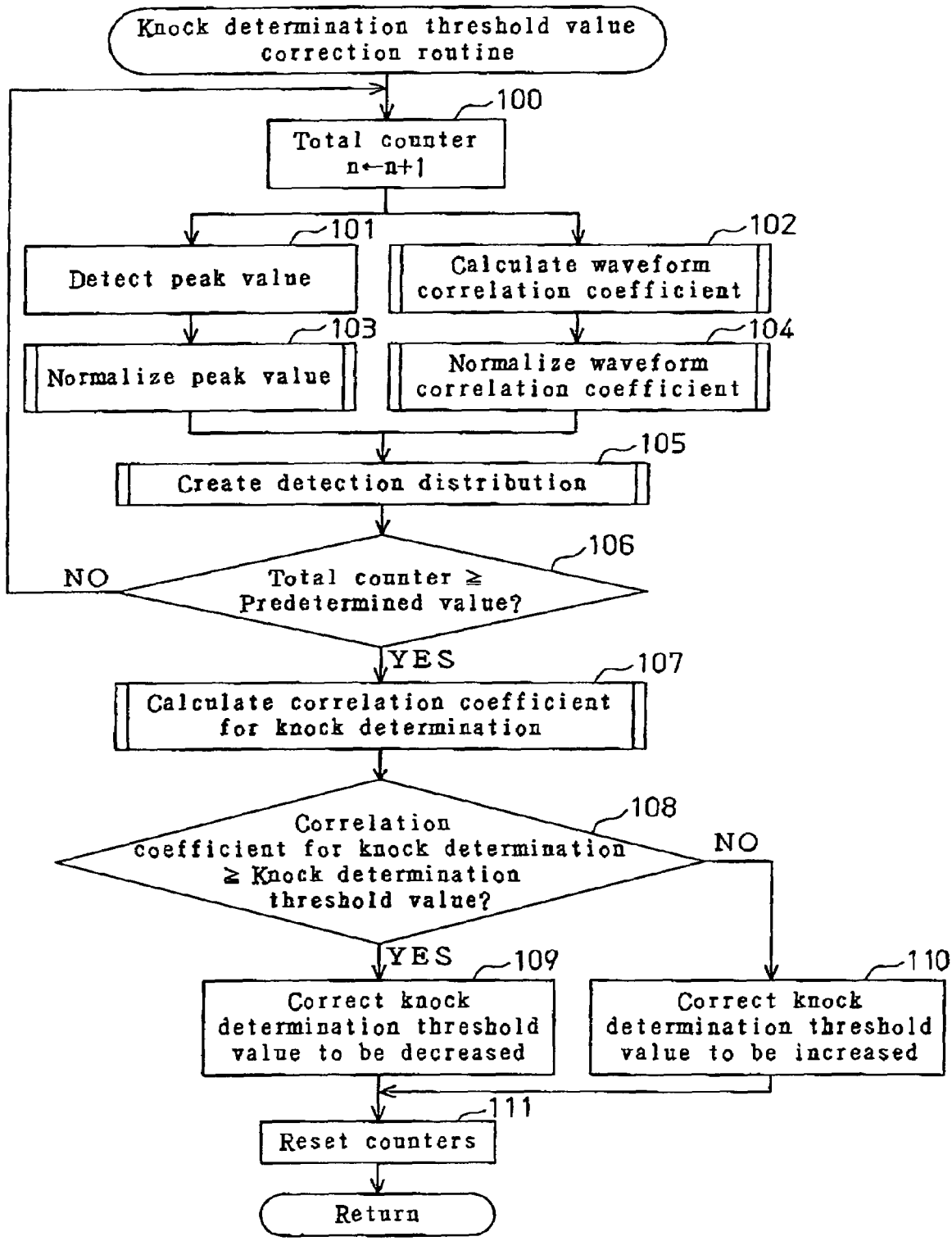
FIG. 2 is a flowchart showing a process of a knock determination threshold value correction routine.

The knock determination threshold value correction routine shown in FIG. 2 is executed periodically while the engine is running. When the routine is started, at step S100, the ECU 27 increments a total counter that counts the number of samples of the variables (the peak value P and the waveform correlation coefficient C) Subsequently, at step S101, the ECU 27 detects the peak value P of the knock frequency component in the sensor output at every ignition. Then, at step S102, the ECU 27 executes the waveform correlation coefficient calculating routine of FIG. 3 described later to calculate the waveform correlation coefficient C.

Thereafter, the ECU 27 proceeds to step S103, and executes the peak value normalization routine of FIG. 4 described later. That is, the ECU 27 computes the mean and the standard deviation $\sigma$ of the peak value P using the smoothing process and normalizes (equates, make dimensionless) the peak value P using the mean and the standard deviation $\sigma$. Thereafter, the ECU 27 proceeds to step S104 and executes the waveform correlation coefficient normalization routine of FIG. 5 described later. That is, the ECU 27 computes the mean and the standard deviation $\sigma$ of the waveform correlation coefficient C using the smoothing process and normalizes (equates, make dimensionless) the waveform correlation coefficient C using the mean and the standard deviation $\sigma$.

Thereafter, the ECU 27 proceeds to step S105 and executes the detection distribution creating routine (not shown) to create the detection distribution as described below. In this embodiment, few regions in which the characteristics of a knock become significant (characteristic regions) are extracted from the regions in which the detection distribution possibly exists. Then, a counter is provided in each characteristic region. The ECU 27 determines whether the normalized data values (Sp, Sc) of the peak value P and the waveform correlation coefficient C correspond to any of the characteristic regions. If there is a corresponding characteristic region, the ECU 27 increments the counter of the appropriate characteristic region, and if there is no corresponding characteristic region, the ECU 27 does not increment the counter of the characteristic region. The ECU 27, which executes the above described process of steps S101 to S105, serves as distribution determining means or a distribution determining section.

Thereafter, the ECU 27 proceeds to step 5106, and determines whether the value of the total counter has reached a predetermined value. If the value of the total counter has not reached the predetermined value, the ECU 27 repeats the process of steps S100 to S105. Therefore, until the number of samples of the peak value P and the waveform correlation coefficient C respectively reach the predetermined values, the ECU 27 repeats sampling of the peak value P and the waveform correlation coefficient C, normalization of the data values, and creating the detection distribution.

When the value of the total counter has reached the predetermined value, the ECU 27 proceeds to step S107, and executes the correlation coefficient for knock determination calculating routine (not shown) to calculate the correlation coefficient for knock determination representing the correlation between the detection distribution based on the normalized data values (Sp, Sc) and the ideal knock distribution. The correlation coefficient for knock determination is obtained by dividing the inner product of the pattern of the detection distribution based on the normalized data values (Sp, Sc) and the pattern of the ideal knock distribution by the product of the norms.

Thereafter, the ECU 27 proceeds to step S108, and compares the correlation coefficient for knock determination with the predetermined knock determination threshold value. If the correlation coefficient is greater than the knock determination threshold value, the ECU 27 determines that a knock exceeding the permissible level is occurring and proceeds to step S109. At step S109, the ECU 27 corrects the knock determination threshold value used for knock determination at every single combustion to be decreased. Therefore, small knocks are detected. Contrarily, if the correlation coefficient for knock determination is smaller than the knock determination threshold value, the ECU 27 determines that the knock level is below the permissible level. In this case, there is a possibility that the ignition timing is retarded more than necessary by the knock control, thereby decreasing the engine torque. Therefore, the ECU 27 proceeds to step S110, and corrects the knock determination threshold value to be increased so that only greater knocks are detected. Thereafter, the ECU 27 proceeds to step S111, and resets all the counters used in this routine. Then, the ECU 27 ends the routine.

The ECU 27, which executes the above described process of steps S107 and S108, serves as knock determining means or a knock determining section.

[Waveform Correlation Coefficient Calculating Routine]

Figure 3:
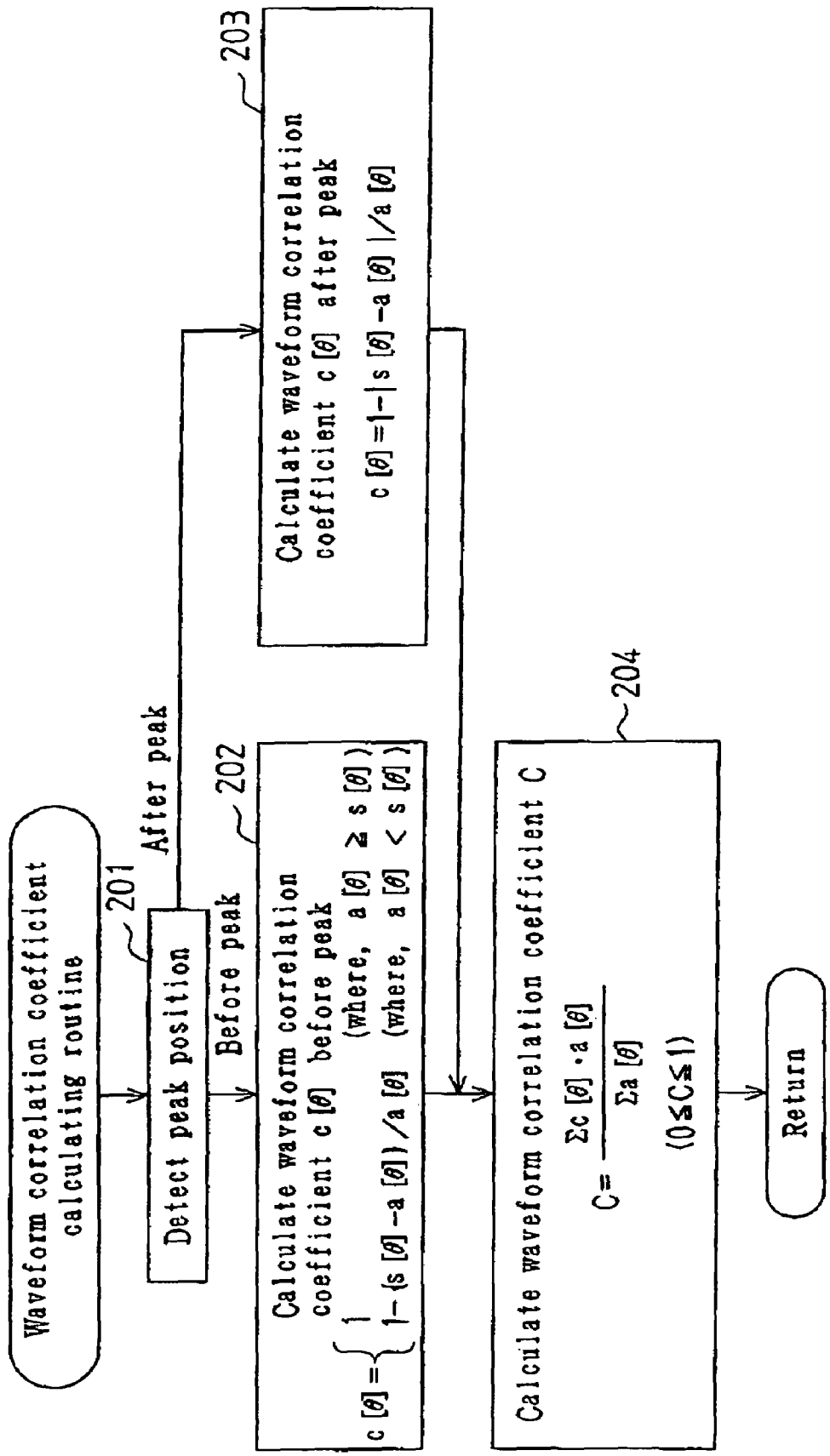
FIG. 3 is a flowchart showing a process of a waveform correlation coefficient calculating routine.
Figure 6:
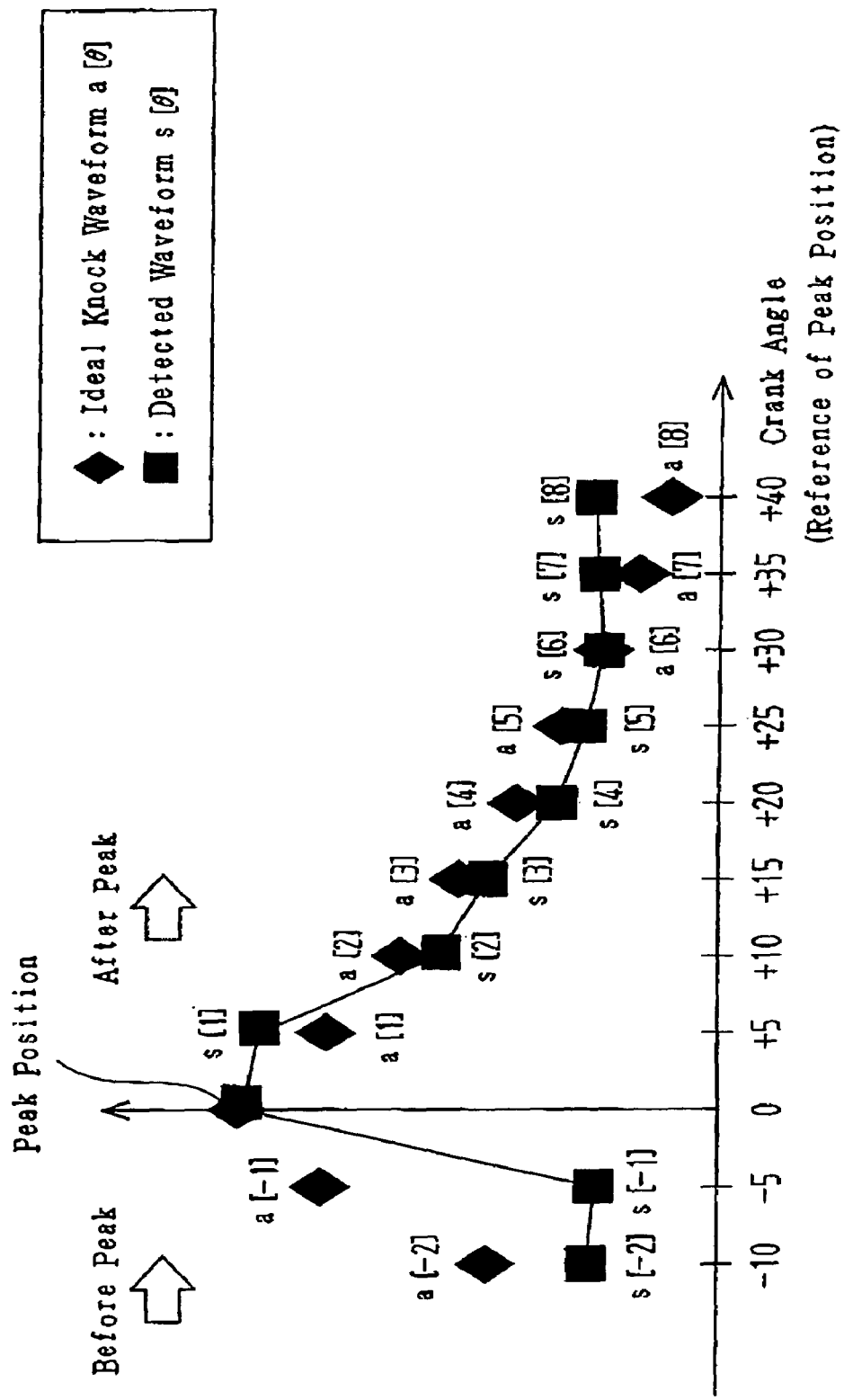
FIG. 6 is a graph showing one example of the detected waveform $s[\theta]$ and the ideal knock waveform $a[\theta]$.

The waveform correlation coefficient calculating routine of FIG. 3 is a subroutine executed in step S102 of the knock determination threshold value correction routine of FIG. 2. When the routine is started, at step S201, the ECU 27 detects the peak position of the waveform of the detected sensor output (hereinafter, referred to as detected waveform) (see FIG. 6).

Then, at step S202, the ECU 27 compares the detected waveform s[θ] before the peak with the ideal knock waveform a[θ], and calculates the waveform correlation coefficient c[θ] before the peak as follows. That is, the ECU 27 determines whether the detected waveform s[θ] at the crank angle θ before the peak is less than or equal to the ideal knock waveform a[θ]. If the detected waveform s[θ] at the crank angle θ before the peak is less than or equal to the ideal knock waveform a[θ], the ECU 27 sets the waveform correlation coefficient c[θ] before the peak at the crank angle θ before the peak to "1". If the detected waveform s[θ] at the crank angle θ before the peak is greater than the ideal knock waveform a[θ], the ECU 27 calculates the waveform correlation coefficient c[θ] before the peak at the crank angle θ before the peak using the following equation.

$$c[\theta]=1-\{s[\theta]-a[\theta]\}/a[\theta]$$

Figure 7:
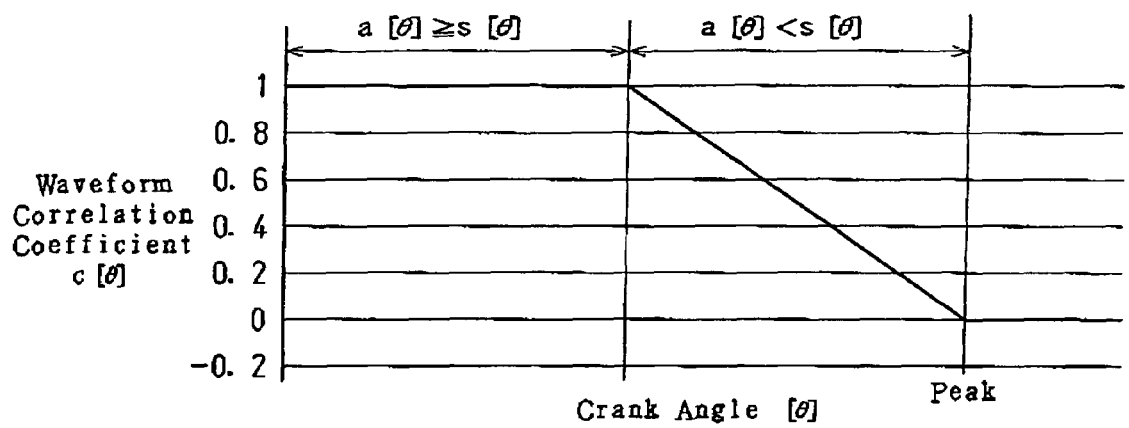
FIG. 7 is a graph showing one example of the waveform correlation coefficient $c[\theta]$ before the peak.

In this case, as the deviation {s[θ]−a[θ]} between the detected waveform s[θ] and the ideal knock waveform a[θ] increases, the correlation is reduced, thereby reducing the waveform correlation coefficient c[θ] before the peak. FIG. 7 shows a calculation example of the waveform correlation coefficient c[θ] before the peak.

At step S203, the ECU 27 uses the detected waveform s[θ] after the peak and the ideal knock waveform a[θ] to calculate the waveform correlation coefficient c[θ] after the peak at the crank angle θ after the peak by the following equation.

$$c[\theta]=1-|s[\theta]-a[\theta]|/a[\theta]$$

Figure 8:
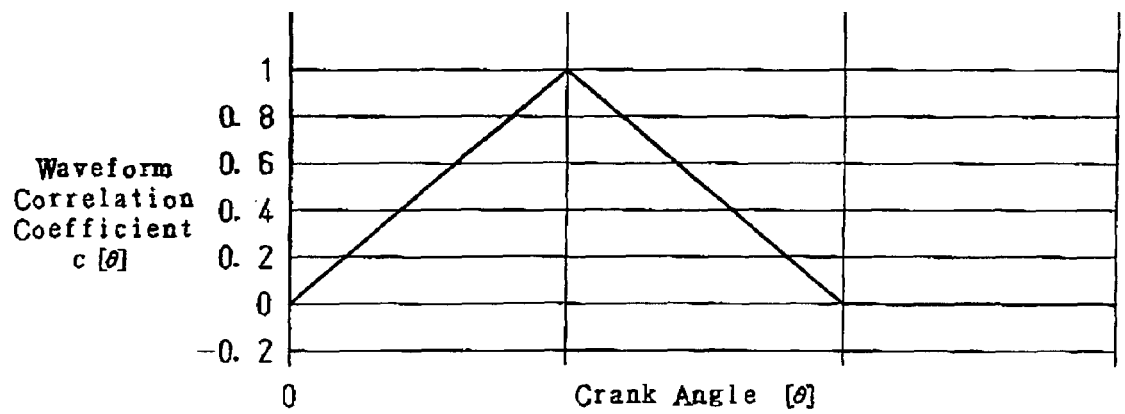
FIG. 8 is a graph showing one example of the waveform correlation coefficient $c[\theta]$ after the peak.

In this case also, as the absolute value |s[θ]−a[θ]| of the deviation between the detected waveform s[θ] and the ideal knock waveform a[θ] increases, the correlation is reduced. Therefore, the waveform correlation coefficient c[θ] after the peak is decreased. FIG. 8 shows a calculation example of the waveform correlation coefficient c[θ] after the peak.

After repeating the process for calculating the waveform correlation coefficient c[θ] for all the crank angle θ during a predetermined period from before the peak to after the peak in the above described manner, the ECU 27 proceeds to step S204, and calculates the final waveform correlation coefficient C by the following equation.

$$C=\Sigma c[\theta]\times a[\theta]/\Sigma a[\theta]$$

According to the above equation, the waveform correlation coefficient C always becomes less than or equal to one (0≦C≦1), and as the correlation between the detected waveform s[θ] and the ideal knock waveform a[θ] is increased, the waveform correlation coefficient C approaches a value close to one.

[Peak Value Normalization Routine]

Figure 4:
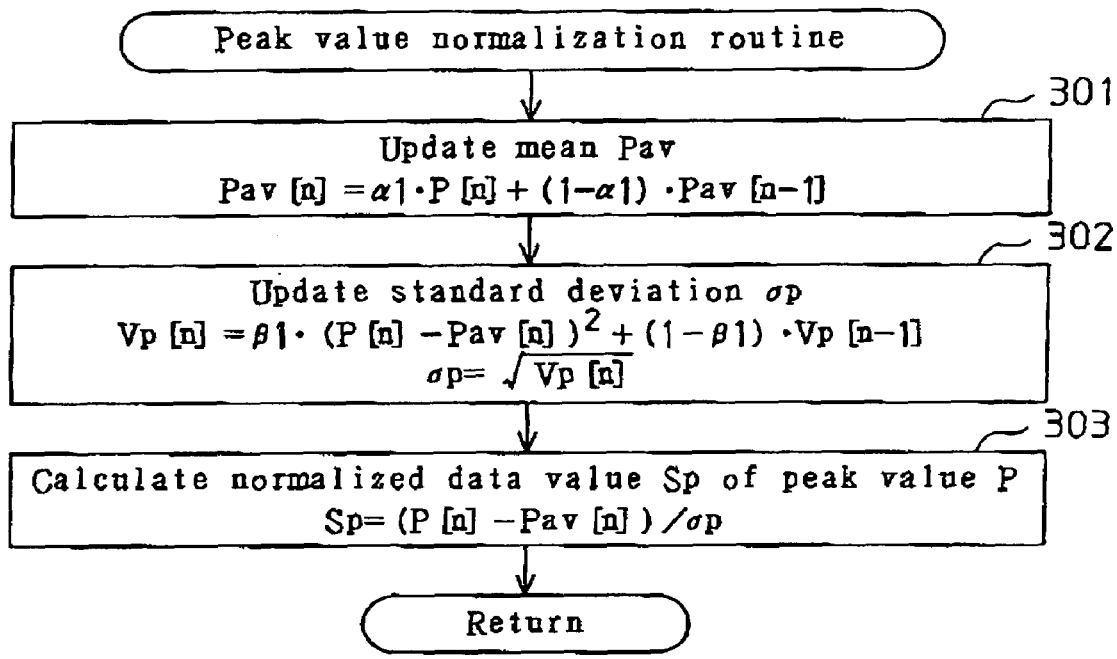
FIG. 4 is a flowchart showing a process of a normalization routine of a peak value.

The peak value normalization routine of FIG. 4 is a subroutine executed in step S103 of the knock determination threshold value correction routine of FIG. 2. When the routine is started, at step S301, the ECU 27 calculates the current mean Pav[n] of the peak value P[n] using the previously calculated mean Pav[n−1] of the peak value P stored in the RAM of the ECU 27 and the current peak value P[n] by the following equation of the smoothing process.

$$Pav[n]=\alpha1\times P[n]+(1-\alpha1)\times Pav[n-1]$$

In the above equation, α1 represents a coefficient of smoothing. The smoothing coefficient α1 may be fixed values to simplify the computation process. Alternatively, the smoothing coefficient α1 may be changed in accordance with the engine operating state using a map, a mathematical expression, or the like. If this is the case, for example, during a normal operation of the engine, a setting that stresses the accuracy of the mean Pav is selected, and when the engine is in a transient operating state, a setting that stresses the trackability is selected. That is, the accuracy and the trackability are adjusted in accordance with the engine operating state.

Thereafter, the ECU 27 proceeds to step S302 and calculates the current variance Vp[n] of the peak value P using the previously calculated variance Vp[n−1] of the peak value P stored in the RAM of the ECU 27 and the current mean Pav[n] of the peak value P by the following smoothing process.

$$Vp[n]=\beta1\times\{P[n]-Pav[n]\}^2+(1-\beta1)\times Vp[n-1]$$

In the above equation, β1 represents a coefficient of smoothing. In this case, the smoothing coefficient β1 may be a fixed value to simplify the computation process. Alternatively, the smoothing coefficient β1 may be changed in accordance with the engine operating state using a map, a mathematical expression, or the like. If this is the case, for example, during a normal operation of the engine, a setting that stresses the accuracy of the variance Vp is selected, and when the engine is in a transient operating state, a setting that stresses the trackability is selected. That is, the accuracy and the trackability are adjusted in accordance with the engine operating state.

At step S302 also, the ECU 27 computes the square root of the variance Vp[n] of the peak value P to obtain the standard deviation σp of the peak value P ($\sigma p=\sqrt{Vp[n]}$).

Thereafter, the ECU 27 proceeds to step S303 and calculates the normalized data value Sp of the peak value P by the following equation.

$$Sp=\{P[n]-Pav[n]\}/\sigma p$$

[Waveform Correlation Coefficient Normalization Routine]

Figure 5:
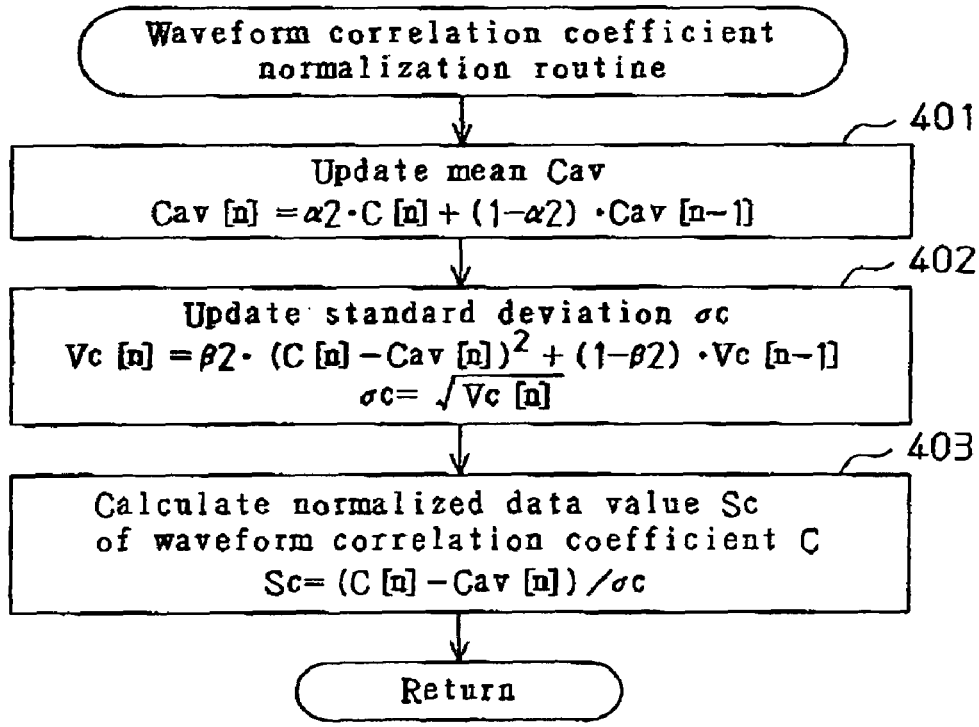
FIG. 5 is a flowchart showing a process of a normalization routine of a waveform correlation coefficient.

The waveform correlation coefficient normalization routine of FIG. 5 is a subroutine executed in step S104 of the knock determination threshold value correction routine of FIG. 2. When the routine is started, at step S401, the ECU 27 calculates the current mean Cav[n] of the waveform correlation coefficient C[n] using the previously calculated mean Cav[n−1] of the waveform correlation coefficient C stored in the RAM of the ECU 27 and the current waveform correlation coefficient C[n] by the following equation of the smoothing process.

$$Cav[n]=\alpha 2\times C[n]+(1-\alpha 2)\times Cav[n-1]$$

In the above equation, α2 represents a coefficient of smoothing The smoothing coefficient α2 may be fixed values to simplify the computation process. Alternatively, the smoothing coefficient α2 may be changed in accordance with the engine operating state using a map, a mathematical expression, or the like. If this is the case, for example, during a normal operation of the engine, a setting that stresses the accuracy of the average value Cav is selected, and when the engine is in a transient operating state, a setting that stresses the trackability is selected. That is, the accuracy and the trackability are adjusted in accordance with the engine operating state.

Thereafter, the ECU 27 proceeds to step S402, and calculates the current variance Vc[n] of the waveform correlation coefficient C using the previously calculated variance V c[n−1] of the waveform correlation coefficient C stored in the RAM of the ECU 27 and the current mean Cav[n] of the waveform correlation coefficient C by the following equation of the smoothing process.

$$Vc[n]=\beta 2\times \{C[n]-Cav[n]\}^2+(1-\beta 2)\times Vc[n-1]$$

In the above equation, β2 represents a coefficient of smoothing. The smoothing coefficient β2 may be a fixed value to simplify the computation process. Alternatively, the smoothing coefficient β2 may be changed in accordance with the engine operating state using a map, a mathematical expression, or the like. If this is the case, for example, during a normal operation of the engine, a setting that stresses the accuracy of the variance Vc is selected, and when the engine is in a transient operating state, a setting that stresses the trackability is selected. That is, the accuracy and the trackability are adjusted in accordance with the engine operating state.

At step S402 also, the ECU 27 computes the square root of the variance Vc[n] of the waveform correlation coefficient C to obtain the standard deviation σc of the waveform correlation coefficient C ($\sigma c=\sqrt{Vc[n]}$).

Thereafter, the ECU 27 proceeds to step S403 and calculates the normalized data value Sc of the waveform correlation coefficient C by the following equation.

$$Sc=\{C[n]-Cav[n]\}/\sigma c$$

According to the above described embodiment, the ECU 27 obtains the peak value of the knock frequency component in the sensor output and the waveform correlation coefficient representing the correlation between the waveform of the sensor output and the ideal knock waveform, which is the waveform specific to a knock. The ECU 27 then creates the distribution of the peak value and the waveform correlation coefficient corresponding to the predetermined number of times of ignition. Therefore, unlike the distribution that uses only the peak value of the sensor output as that created in the publication No. 6-60621, the ECU 27 creates a distribution that distinguishes noise from a knock. Therefore, the problem of deterioration of knock determination accuracy due to noise is solved, thereby improving the accuracy and the reliability of knock determination.

Furthermore, in this embodiment, the data values of the peak value and the waveform correlation coefficient corresponding to the predetermined number of times of ignition are respectively normalized using the corresponding mean and the corresponding standard deviation to create the detection distribution. Therefore, a universal detection distribution is created that has no differences due to the operating condition of the engine, and the detection distribution need not be created per each engine operating condition. This reduces the processing load of producing a distribution and prevents deterioration of the accuracy of the detection distribution due to changes of the engine operating condition.

Furthermore, in this embodiment, the correlation coefficient for the knock determination representing the correlation (similarity) between the detection distribution and the ideal knock distribution is calculated as the index of the knock level. Based on the correlation coefficient for knock determination (knock level), the knock determination threshold value used for knock determination at every single combustion is corrected. Therefore, even if a mechanical or electrical noise overlaps the sensor output, the knock determination threshold value is accurately corrected. This prevents decrease of the knock determination accuracy due to noise. Furthermore, the knock determination threshold value is automatically corrected in accordance with the production variation of the engine and changes of vibration level with time. Therefore, high precision knock determination is performed always using the appropriate knock determination threshold value. In addition, a design and development engineer need not to closely consider the influence of the production variation of the engine and deterioration with time when adapting the knock determination threshold value to the engine. This simplifies a process for adapting the knock determination threshold value to the engine.

In this embodiment, the knock sensor 28, which detects the vibration of the cylinder block, is used as a sensor that outputs a signal having a waveform that corresponds to the knock state. However, a combustion pressure sensor, which detects the combustion pressure, may be used. Alternatively, an ion current sensor, which detects the ion current in the combustion chamber, may be used.

The invention claimed is:

1. A knock determining apparatus for an internal combustion engine, comprising:

a sensor, which outputs a signal that has a waveform corresponding to the knock state of the internal combustion engine; and an engine control unit, wherein the engine control unit: obtains a plurality of variables representing the characteristics of a knock from an output signal of the sensor every time the engine is ignited; obtains a distribution of the variables corresponding to a predetermined number of times of ignition; and determines the occurrence of a knock based on whether the profile of the obtained distribution has the characteristics that appear at the occurrence of a knock.

2. A knock determining apparatus for an internal combustion engine, comprising:

a sensor, which outputs a signal that has a waveform corresponding to the knock state of the internal combustion engine;

a distribution determining section, wherein the distribution determining section obtains a plurality of variables representing the characteristics of a knock from an output signal of the sensor every time the engine is ignited, and obtains a distribution of the variables corresponding to a predetermined number of times of ignition; and a knock state determining section, which determines the occurrence of a knock based on whether the profile of the distribution obtained by the distribution determining section has the characteristics that appear at the occurrence of a knock.

3. The knock determining apparatus according to claim 2, wherein the variables include a peak value of the knock frequency component in the output signal of the sensor and a waveform correlation coefficient representing the correlation between the waveform of the output signal and an ideal knock waveform, which is the waveform specific to a knock.

4. The knock determining apparatus according to claim 2, wherein the distribution determining section normalizes data values of the variables corresponding to the predetermined number of times of ignition using the mean and a standard deviation of each variable, and obtains the distribution of the normalized data values of the variables.

5. The knock determining apparatus according to claim 4, wherein the mean and the standard deviation are approximately obtained by filtering the corresponding variable.

6. The knock determining apparatus according to claim 2, wherein the distribution determining section extracts a plurality of regions in which the characteristics of a knock become significant (hereinafter referred to as characteristic regions) from regions in which the distribution possibly exists, provides a counter in each characteristic region, and increments the counter of the characteristic region to which the variables belong at every ignition to obtain the distribution.

7. The knock determining apparatus according to claim 2, further comprising a storage section, wherein, when a knock exceeding a permissible level is occurring, the storage section stores, as an ideal knock distribution, the distribution of the variables corresponding to the predetermined number of times of ignition, wherein the knock state determining section obtains the correlation between the distribution obtained by the distribution determination section and the ideal knock distribution while the engine is running, and determines that the knock level is greater as the correlation is increased.

8. The knock determining apparatus according to claim 2, wherein the knock state determining section includes:

a level determining section for determining the knock level based on the distribution obtained by the distribution determining section;

a knock determining section for comparing the knock level with a predetermined knock determination threshold value to determine the existence of a knock; and a correcting section for correcting the knock determination threshold value in accordance with the comparison result of the knock level and the knock determination threshold value.

9. The knock determining apparatus according to claim 2, wherein the sensor is one of a knock sensor, which detects vibration of a cylinder block of the engine, a combustion pressure sensor, which detects the combustion pressure of the engine, and an ion current sensor, which detects the ion current in a combustion chamber of the engine.

10. A knock determining method for an internal combustion engine, comprising:

outputting a signal that has a waveform corresponding to the knock state of the internal combustion engine from a sensor;

obtaining a plurality of variables representing the characteristics of a knock from an output signal of the sensor every time the engine is ignited;

obtaining a distribution of the variables corresponding to a predetermined number of times of ignition; and determining the occurrence of a knock based on whether the profile of the obtained distribution has the characteristics that appear at the occurrence of a knock.

11. The knock determining method according to claim 10, wherein the variables include a peak value of the knock frequency component in the output signal of the sensor and a waveform correlation coefficient representing the correlation between the waveform of the output signal and an ideal knock waveform, which is the waveform specific to a knock.

* * * * *